March 6, 1962     W. J. SMOTHERS ET AL     3,024,303
GLAZED INSULATOR WHICH COMPRISES A CERAMIC BODY AND A PRIMARY
COAT UNDER THE GLAZE WHICH HAS A LOWER COEFFICIENT
OF THERMAL EXPANSION THAN THE CERAMIC BODY
Filed March 9, 1960

INVENTORS
WILLIAM J. SMOTHERS &
JORGEN SELSING
BY

ATTORNEY

United States Patent Office 3,024,303
Patented Mar. 6, 1962

3,024,303
GLAZED INSULATOR WHICH COMPRISES A CERAMIC BODY AND A PRIMARY COAT UNDER THE GLAZE WHICH HAS A LOWER COEFFICIENT OF THERMAL EXPANSION THAN THE CERAMIC BODY
William J. Smothers and Jorgen Selsing, Akron, Ohio, assignors to The Ohio Brass Company, Mansfield, Ohio, a corporation of New Jersey
Filed Mar. 9, 1960, Ser. No. 13,774
13 Claims. (Cl. 174—189)

This invention relates to a new insulator of the type having a ceramic body, and to a novel coating applied to such a body to strengthen the insulator and otherwise improve it. The invention includes the method of producing the insulator as well as the insulator.

It has been recognized that it is desirable to cover the ceramic body of an insulator with a coating which is held under compression. The invention pertains to the use of a new coating which has a coefficient of thermal expansion less than that of the ceramic body of the insulator, so that upon cooling the coating is in compression. The coating is preferably applied in two steps, as a primary coat which is crystalline and has a low coefficient of thermal expansion, and then a cover coat which is a glaze.

Where the glaze serves as a surface coating, as on the skirt of a suspension insulator, its smooth surface prevents leakage losses which would occur from the uncoated crystalline primary coating. The glaze has other functions where it is not exposed on the surface of the insulator, as for example, where it is covered with a cement, as is customary under the metal cap in a suspension insulator. Here the glaze serves as a matrix to hold sand to which the cement adheres. In either case, the glaze strengthens the insulator.

Coatings maintained under compression have been used on insulator bodies to improve the strength of the insulators. However, it is new to employ such a coating adjacent the insulator body and then cover this with a glaze. This is the preferred procedure. Magnesium aluminum silicate (cordierite) or lithium aluminum silicate (either spodumene or eucryptite) each of which has an exceptionally low coefficient of thermal expansion and is crystalline in nature is used in the primary coat or layer. In order to obtain the high compression desired in the primary coating or layer there must be so much of one of these silicates present, generally at least 50 percent, that the primary coating after firing and cooling has an essentially smooth exterior but with a mat finish. To produce the desired smooth surface, or to obtain a suitable matrix for sand or the like, the glaze finish is applied over the primary coat.

In producing the insulator by the two-step process, the ceramic body is dried before the primary coat is applied, and the primary coat is dried before applying the glaze. It is necessary to dry the primary coat before applying the glaze in order to prevent solution of the primary coat and glaze into one another. The two are seen to be distinct under the microscope. Each is generally about .010 inch thick.

Although not generally practical, it is possible to fire the insulator body and then separately fire the primary coat, and subsequently fire the glaze. Actually the primary coat applied as a slip to the dried ceramic body, in any manner whatsoever, but usually either by spraying or dipping, is allowed to dry, largely by absorption of water into the ceramic body. After it has dried the glaze is applied by dipping or spraying or in any other suitable manner. Then after this is dried the whole is fired in a single firing operation.

The insulator body may be of any suitable ceramic composition. The composition of the primary coat may vary, but it is largely lithium or magnesium aluminum silicate or a mixture of the two. In some constructions one silicate will be preferred rather than the other. The silicate may be preformed, or it may be formed during the firing of the primary coat.

The composition of the glaze may be varied. Any of the usual insulator glazes may be employed. The various materials will be worked in the usual manner. The firing temperature may vary as is known in the art, but it will usually be about 2250° F.

After firing, the insulator and coatings solidify at about 1300° F. In the subsequent cooling of the freshly made insulator, the primary coating contracts less than the insulator body and less than the glaze. Ordinarily the glaze used will be one which contracts less than the insulator body but more than the primary coating. As the insulator cools after firing, the primary coating contracts less than either the insulator or the glaze, therefore in the final state, the coating is under compression.

The insulator may be in the form of a post, a lightning arrester, a suspension insulator, etc. The invention will be further described in connection with a suspension insulator of the type shown in the drawings, in which.

Figure 1:
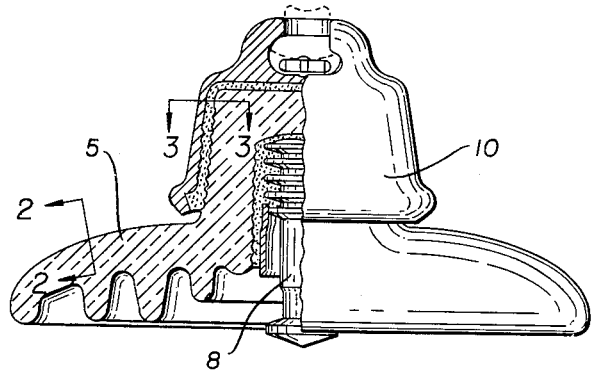
FIG. 1 is a side elevation of the insulator, partly broken away to show its construction.
Figure 2:
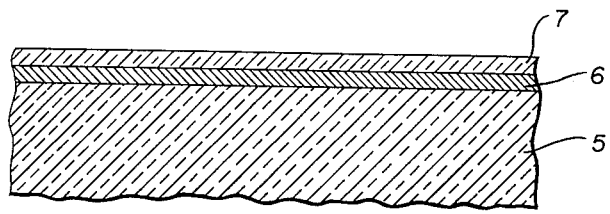
FIG. 2 is an enlarged section through the skirt on the line 2—2 of FIG. 1.
Figure 3:
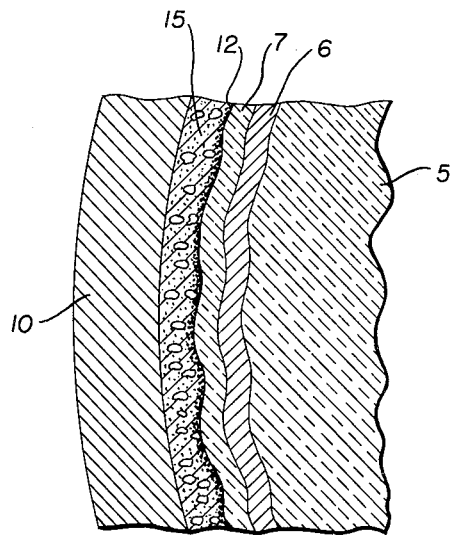
FIG. 3 is an enlarged section through the cement and metal cap, etc., on the line 3—3 of FIG. 1.

In the drawings, the ceramic body 5 is first covered with primary coat 6 and then with glaze 7. The pin 8 is held in place in any suitable manner known in the art.

Under the metal cap 10, the glaze 7 is sanded with particles 12 of sand before firing. The space between the sanded glaze and the cap is then filled with any usual cement 15.

A suitable primary coat is made as follows:

*Example 1 (Primary Coat)*

| | Parts by weight |
|---|---|
| Talc | 200 |
| Alumina | 300 |
| English china clay | 300 |
| Hannover clay | 200 |

Sufficient water is added to make a slip satisfactory for spraying (e.g. 1000 parts by weight) or for dipping (e.g. 1300 parts by weight). This primary coat is preferably fired by heating to 2250° F. for 2 hours.

Three representative formulae for the primary coat, using weight percent, are given below:

*Examples 2, 3 and 4 (Primary Coat)*

[Percent]

| Example No. | 2 | 3 | 4 |
|---|---|---|---|
| Talc | 36 | 15 | 20 |
| Clay | 40 | 50 | 80 |
| Alumina hydrate | 24 | 35 | |
| | 100 | 100 | 100 |

The percent cordierite formed depends upon the heating schedule and other variables, but in any event will be over 50 percent (by weight) of the fired product. Mullite, cristabolite, quartz and the like may also be present. Any required amount of water is added before use.

Instead of talc to which each of the foregoing formulae refers, the equivalent amount of magnesium carbonate can be used to supply the required magnesium, and the clay content can be increased to provide the additional silica necessary to keep the batch in the given compositional range. When the clay content is increased, the additional $Al_2O_3$ introduced can be deducted from the amount of alumina hydrate which would otherwise be required. The alumina may be in the form of hydrate or calcined alumina—both will assist in forming cordierite on firing. Also bauxite (sometimes assigned the formula $Al_2O_3.2H_2O$) can be used.

Typical glaze formulae follow. These are given as illustrative and not as limiting, because any glaze usually employed for ceramic insulators can be used. The formulae are stated in terms of molecular equivalents as understood in the art.

GLAZE FORMULAE

Example 1

| | | | | | |
|---|---|---|---|---|---|
| $K_2O$ | 0.09 | | | | |
| $Na_2O$ | .04 | $Al_2O_3$ | 0.43 | $SiO_2$ | 4.12 |
| $CaO$ | .48 | $Fe_2O_3$ | .08 | | |
| $MgO$ | .14 | | | | |
| $ZnO$ | .08 | | | | |
| $MnO$ | .17 | | | | |

Example 2

| | | | | | |
|---|---|---|---|---|---|
| $K_2O$ | 0.09 | | | | |
| $Na_2O$ | .04 | $Al_2O_3$ | 0.68 | $SiO_2$ | 4.79 |
| $CaO$ | .55 | $Fe_2O_3$ | .08 | | |
| $MgO$ | .30 | $Cr_2O_3$ | .03 | | |
| $NiO$ | .02 | | | | |

Example 3

| | | | | | |
|---|---|---|---|---|---|
| $K_2O$ | 0.10 | | | | |
| $Na_2O$ | .06 | $Al_2O_3$ | 0.54 | $SiO_2$ | 3.81 |
| $CaO$ | .60 | | | | |
| $MgO$ | .24 | | | | |

The thermal expansion of a ceramic body such as used in insulators is approximately $6.9 \times 10^{-6}$ per degree centigrade. That of the customary glazes is of the order of $5.8 \times 10^{-6}$. The thermal expansions of the fired primary coat of Examples 2, 3 and 4 are $3.2 \times 10^{-6}$, $4.0 \times 10^{-6}$, and $3.5 \times 10^{-6}$, respectively.

The formulae of lithium compounds which maintain the ceramic body under desired compression if present in primary coats in an amount equal to at least 50 percent by weight are $Li_2O.Al_2O_3.4SiO_2$ (spodumene) and $Li_2O.Al_2O_3.2SiO_2$ (eucryptite).

The foregoing is illustrative. The invention is covered in the claims which follow.

What we claim is:

1. A fired insulator which contains a ceramic body, an essentially smooth primary layer on said ceramic body and a glaze on the primary layer, the primary layer comprising an essentially smooth exterior, having a lower coefficient of thermal expansion than the ceramic body and being under compression.

2. The insulator of claim 1 in which the primary layer has a lower coefficient of thermal expansion than the glaze.

3. The insulator of claim 1 in which the primary layer is composed largely of a silicate of the class consisting of cordierite, spodumene and eucryptite.

4. The insulator of claim 1 in which the primary layer is composed largely of cordierite.

5. The insulator of claim 1 which is a suspension insulator substantially the whole of the surface of the ceramic body being covered with the primary layer and glaze, the exposed surface of the glaze thereby having a smooth surface, the insulator including a metallic cap and the major part of the surface of the insulator covered by the cap comprising sand embedded in the glaze, there being a cement bond between the sanded glaze and the cap.

6. The insulator of claim 5 in which the primary layer is largely cordierite.

7. The insulator of claim 1 in which there is sand embedded in the glaze.

8. A fired insulator comprising an insulator body of ceramic material, an essentially smooth primary layer on the body which primary layer is largely cordierite, and a superimposed glaze on said primary layer, the primary layer being under compression due to its having a coefficient of expansion less than that of the insulator body.

9. A fired insulator comprising an insulator body of ceramic material, a primary layer on said body which primary layer contains at least 50 percent cordierite and is under compression due to its having a lower coefficient of expansion than the ceramic body, the primary layer being covered with a glaze.

10. A fired insulator which contains a ceramic body and a glaze coat, and adjacent the composition of the glaze coat but separate therefrom and between the body and the glaze, an essentially smooth layer of a silicate of the class consisting of cordierite, spodumene and eucryptite which layer has a mat finish.

11. The method of producing an insulator which comprises shaping an insulator body of ceramic material, covering this with an essentially smooth coating composed at least largely of a silicate from the class consisting of cordierite, spodumene and eucryptite, drying and covering this with a glaze, and then firing the insulator and its component parts.

12. The method of claim 11 in which the silicate is cordierite.

13. The method of claim 11 in which the essentially smooth coating is a slip coat and it is dried before the glaze is applied to it.

References Cited in the file of this patent

UNITED STATES PATENTS

| | | |
|---|---|---|
| 2,157,100 | Rowland | May 9, 1939 |
| 2,287,976 | Croskey et al. | June 30, 1942 |
| 2,327,972 | Stettinius et al. | Aug. 24, 1943 |
| 2,389,386 | Russell | Nov. 20, 1945 |